Oct. 8, 1957        E. R. PECK        2,809,072
FRUIT OR VEGETABLE HARVESTING CART
Filed April 28, 1955        3 Sheets-Sheet 1
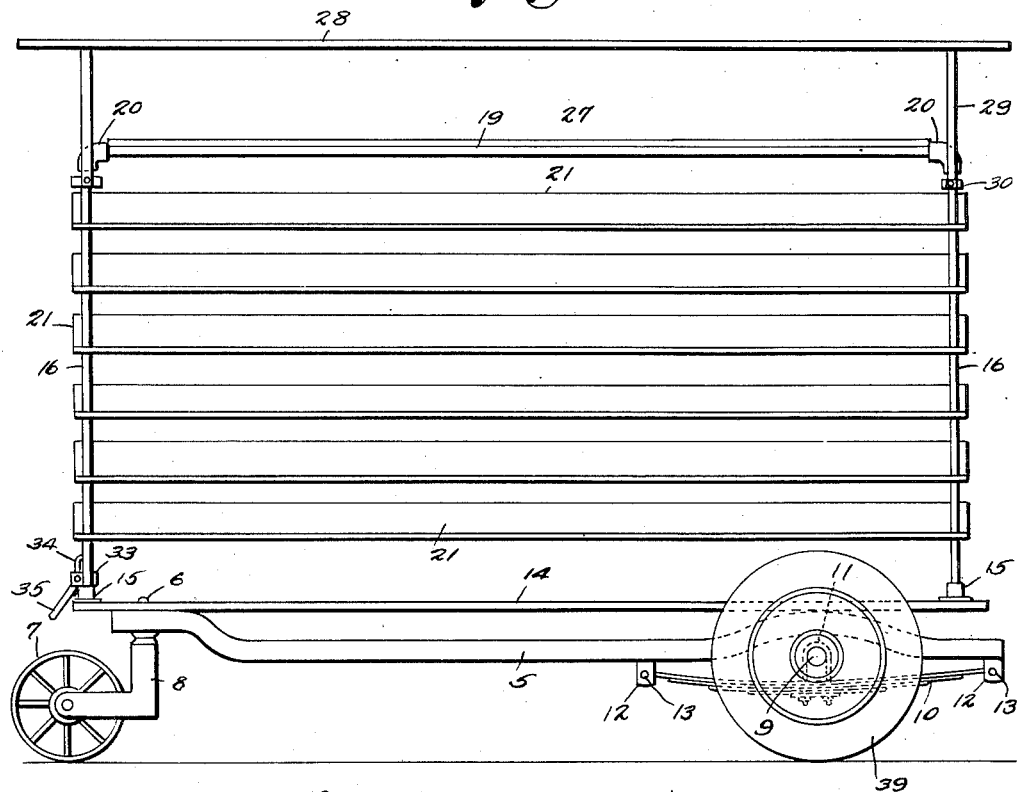
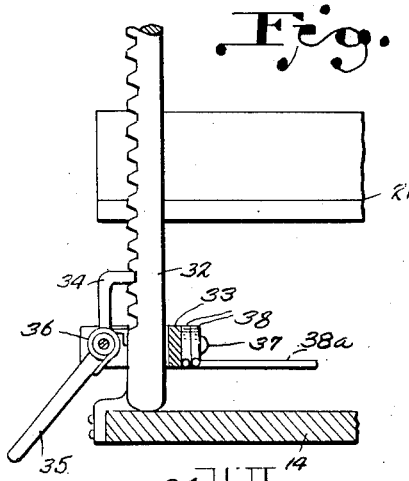
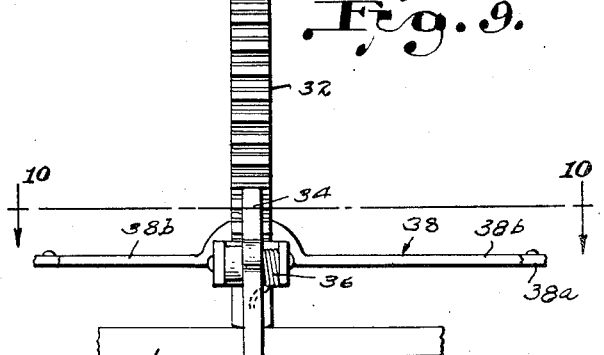
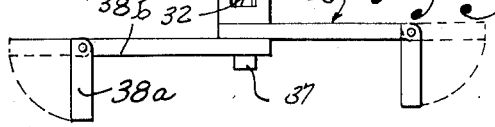
Earl R. Peck
INVENTOR
BY *C. A. Snow & Co.*
ATTORNEYS

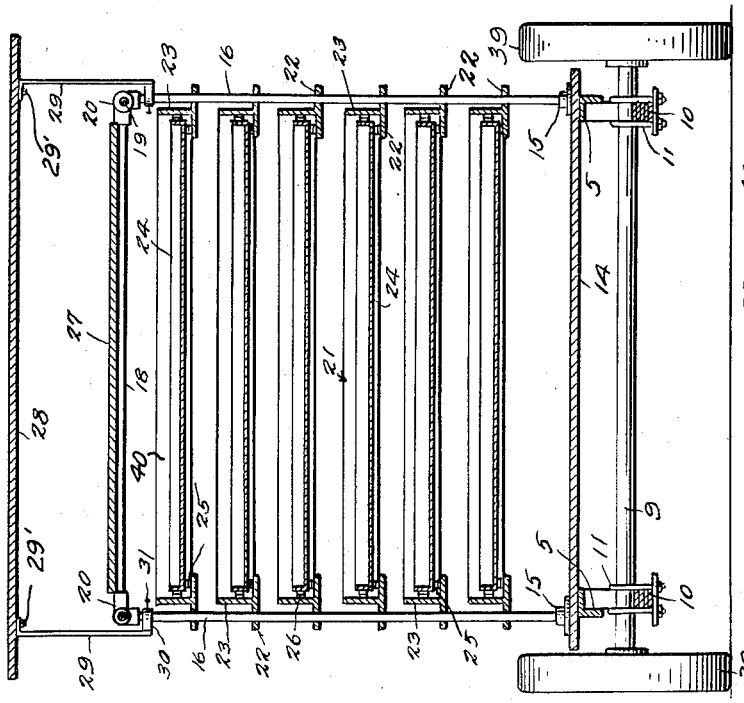
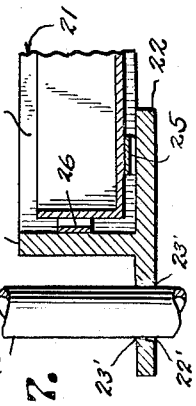
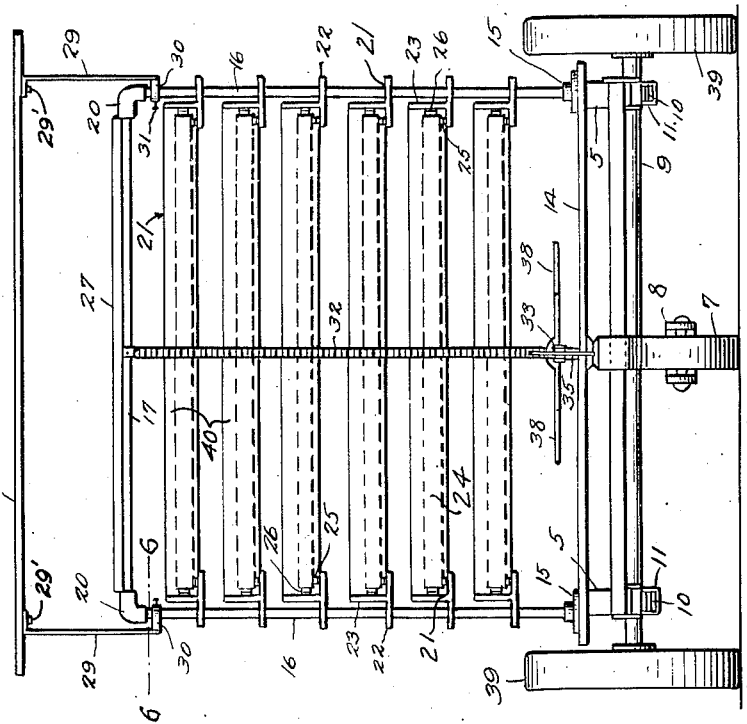
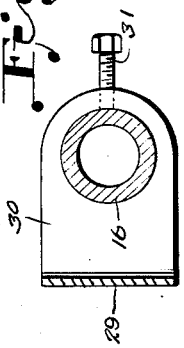

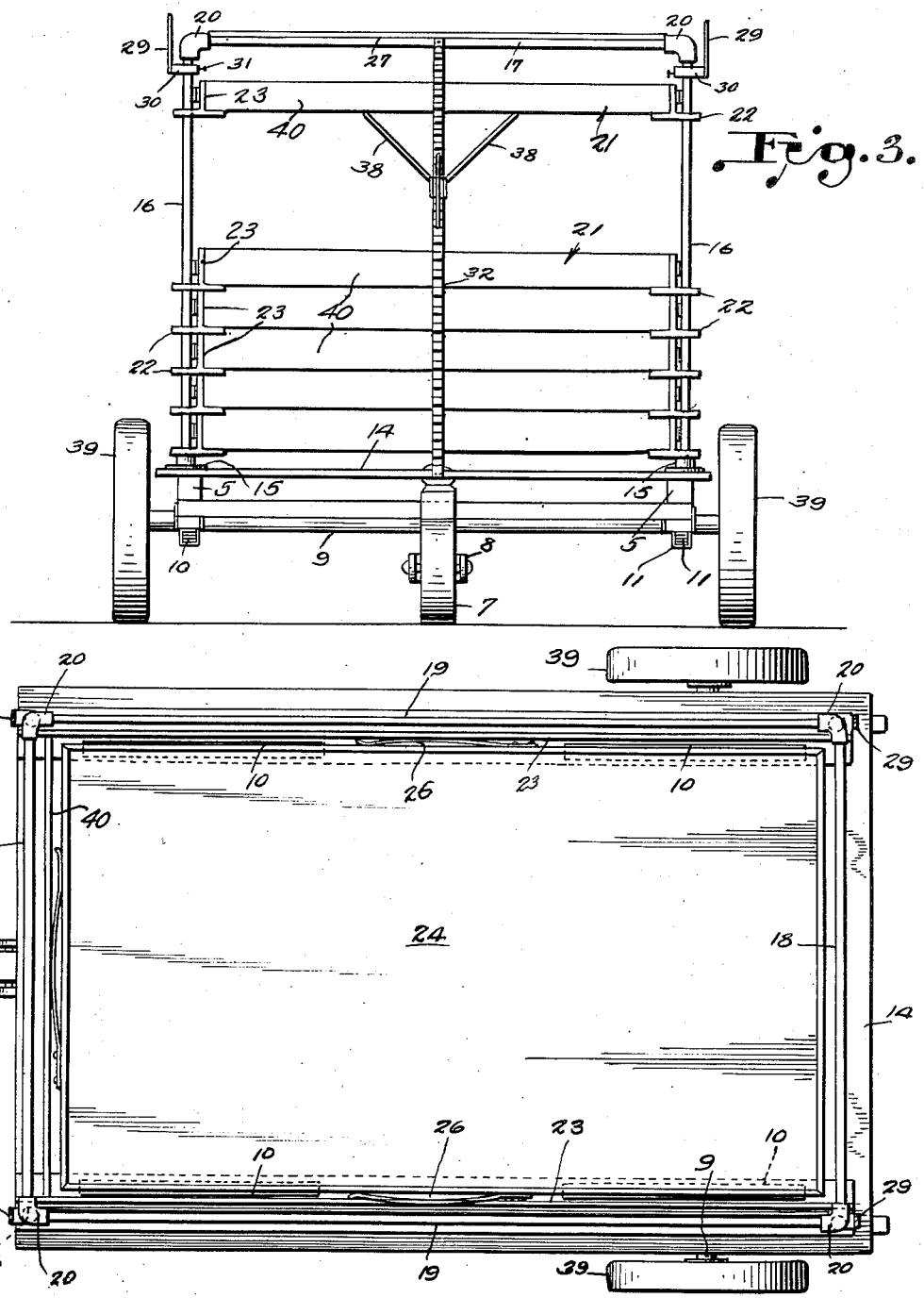

United States Patent Office 2,809,072
Patented Oct. 8, 1957

2,809,072
FRUIT OR VEGETABLE HARVESTING CART

Earl R. Peck, Shreveport, La.

Application April 28, 1955, Serial No. 504,529

1 Claim. (Cl. 296—3)

This invention relates to a harvesting cart designed for use in harvesting perishable fruits and vegetables in the field, with a minimum amount of handling operations in the harvesting and transportation of such fruits and vegetables, from the place of production to gathering yards, canning, packing or processing plants; shipping points or consumer market, over present methods, with a reduction of damage to these products and a saving in time and labor; thus reducing cost to the ultimate consumer.

Another object of the invention is to provide a cart of this character having cushioned shelves, and other cushioning equipment, that are so arranged and constructed that the perishable fruits and vegetables, in boxes or crates, placed thereon to be transported over fields or roads of rough terrain will be cushioned, thereby reducing the possibilities of damage to these products and providing a more pleasing and merchantable product at point of delivery.

Another object of the invention is to provide a harvesting cart with shelves which can be raised or lowered, for loading or unloading; and by placing a cleated pallet thereon to enable the removal of each tier, from the sides of the cart, with the usual fork lift, for placing in a suitable location for processing or other handling; and by releasing the cart promptly for another load, permit more efficient use of grower's equipment, resulting in a considerable saving to both grower and handler.

Still another object of the invention is to provide a cart of this character including a vertical frame and a plurality of vertically adjustable shelves supported thereon, means being provided for holding these shelves in various positions of adjustment throughout the height of the cart.

With the foregoing and other objects in view, which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 1 is a side elevational view of a cart constructed in accordance with the invention.

Figure 2 is a front elevational view thereof.

Figures 3 is a front elevational view illustrating a number of supporting shelves as positioned to receive the shelves in which perishable fruit is packed.

Figure 4 is a plan view of the cart illustrating the shelves as positioned therein.

Figure 5 is a transverse sectional view through the cart.

Figure 6 is a sectional view taken on line 6—6 of Figure 2.

Figure 7 is an enlarged detailed view illustrating the method of securing the shelves to their supporting posts.

Figure 8 is an enlarged elevational view illustrating the lifting means for lifting the shelves.

Figure 9 is a front elevational view thereof.

Figure 10 is a sectional view taken substantially along the line 10—10 of Figure 9 as viewed in the direction indicated by the arrows.

Referring to the drawings in detail, the body or frame of the cart comprises the side rails 5 which have their forward ends converging providing a support for the kingpin 6 on which the castor wheel 7 is mounted, through the medium of the fork 8.

The reference character 9 indicates the rear axle of the cart to which the spring members 10 are bolted, as by means of the U-bolts 11. The ends of the spring members 10 are connected with the side rails 5 by means of the shackles 12 and shackle bolts 13.

A platform indicated by the reference character 14 provides the bottom for the cart. At the respective corners of the platform or bottom 14, are socket members 15 in which the vertical posts 16 have their lower ends secured, the posts at the front end of the platform or bottom 14 being connected at their upper ends by the cross pipe 17, while the rear posts are connected at their upper ends by means of the pipe 18. The posts 16 at the front and rear of the cart are connected by the pipes 19 through the medium of the elbows 20.

The horizontal side bars 22 have openings 22' that receive the vertical posts 16 so that the shelves may move longitudinally of the posts 16. The openings 22' are enlarged and have inclined walls on the side thereof away from the center of the shelf that present biting edges 23' that grip posts 16 under the weight of the fruit or vegetables in the shelves to be hereinafter more clearly described. The vertical posts 16 provide supports for the racks generally indicated at 21 and each rack 21 is formed of inverted T-shaped side bars having horizontal lower flanges 22 and a vertical bar 23. The side bars are connected together at one end by vertical end bars 40 which also form a stop for the trays or shelves.

The outer horizontal flange 22 lying outside the area defined by the vertical flange 23 is of sufficient flexibility to yield as the center of the shelf is depressed by the weight placed thereon, it being noted that only a very slight inclination of the flange out of a horizontal plane is necessary to cause the biting edge 23' to engage a post 16 to secure the shelf against slippage.

The racks, as better shown by Figure 5 of the drawings, extend inwardly and provide supports for the shelves or trays 24 that are removably held on the racks. As shown by Figure 5, the shelves are of a width slightly less than the distance between the vertical sides 23 of the racks, to permit the shelves to be readily and easily positioned or removed.

Leaf springs 25 are provided under the side edges of the shelves 24 and rest directly on the racks 21, there being also provided leaf springs 26 secured to the sides of the shelves and engaging the vertical sides of the racks, for yieldably supporting the shelves on the racks to absorb the shock incident to the cart being moved over irregular terrain, as in a field, reducing the possibilities of damaging the perishable fruit or vegetables contained in the shelves.

The reference character 27 indicates a removable top for the cart which closes the top of the cart and affords a means whereby large objects such as empty baskets, crates or bags may be positioned.

Supported in spaced relation with the top 27, is a removable top 28 which is supported by means of the arms 29 secured at the four corners of the removable top by means of bolts 29', the lower ends of the arms 29 being extended laterally at 30 where they are provided with openings to receive the posts 16, there being provided set screws 31 extended through threaded openings in the laterally extended portions 30, to engage said posts 16 and hold the removable top 28, in its various positions of vertical adjustment. This removable top is provided for shading the workers while depositing their loads on the shelves of the cart, and at the same time protecting the fruit and vegetables being harvested.

Secured to the forward end of the platform or bottom 14 at a point intermediate the side edges thereof, is the rack bar 32 that is of a length to extend throughout the height of the cart, the rack bar 32 including a rack, the teeth of which extend forwardly therefrom, as better shown by Figs. 8 and 9 of the drawings.

The upper end of the rack bar 32 is connected with the front cross pipe 17 providing an exceptionally rigid structure.

Mounted on the rack bar 32 for movement longitudinally thereof, is a yoke 33 to which the pivoted latch 34 is connected, the latch 34 having a handle 35 for effecting movement of the latch 34 against the action of the coiled spring 36, which normally tends to hold the latch 34 into engagement with the teeth of the rack bar.

Secured to the yoke 33 by means of bolt 37, are arms 38 which extend vertically, and may be swung to angular positions such as shown by Fig. 3 of the drawings, to provide rests for the shelves supported within the cart, and permit said shelves to be raised and lowered with facility. The arms 38 are L-shaped in plan, having short terms 38ª adapted to be swung into alignment with the long arms 38ᵇ so that the yoke 33 may be raised or lowered to permit selection of a predetermined shelf to be raised.

It might be further stated that the rear portion of the cart is supported on the wheels 39 mounted on the axle 9.

The number of shelves carried on the cart will of course be predetermined, according to the crops to be harvested, so that there will always be a space between the uppermost shelves to facilitate loading of the shelves during the picking of the fruit or vegetables to be transported by the cart.

From the foregoing it will be seen that I have provided a cart especially designed for harvesting perishable fruits and vegetables, the cart being supplied with a plurality of removable shelves supported in such a way that shock directed to the shelves due to the passage of the cart over rough terrain, will be absorbed to the end that damage to the fruit and vegetables carried in the shelves, will be nil.

While the specific details of one embodiment of this invention have been herein shown and described, the invention is not confined thereto as changes and alterations may be made without departing from the spirit and scope thereof as defined in the appended claim.

I claim:

A harvesting cart comprising a mobile frame, upstanding corner posts carried by said frame, a plurality of superposed racks U-shaped in plan mounted on said posts, each rack being formed of a bar having a cross section of an inverted T-shape, said bar bent into U-shape, a shelf on each rack, springs carried by the bottom and opposite sides of each shelf for cushioning the shelf in the rack, the parallel legs of the U of each rack having openings through which said posts extend, the walls of said openings being inclined inwardly at the top on the side thereof away from the center of the cart relative to the vertical whereby opposite end portions of said openings will grip said posts when said racks are horizontal.

References Cited in the file of this patent
UNITED STATES PATENTS

| | | |
|---|---|---|
| 911,567 | Berkowitz | Feb. 9, 1909 |
| 1,367,672 | Smith | Feb. 8, 1921 |
| 1,393,012 | Dilg | Oct. 11, 1921 |
| 1,991,397 | Lampman | Feb. 19, 1935 |
| 2,071,010 | Weberling | Feb. 16, 1937 |
| 2,125,987 | Braun | Aug. 9, 1938 |
| 2,433,748 | Eide | Dec. 30, 1947 |
| 2,531,925 | Taylor | Nov. 28, 1950 |
| 2,649,972 | Weil | Aug. 25, 1953 |